Dec. 22, 1925.

S. H. PERKY

ROLL

Filed May 27, 1922

Inventor
Scott H. Perky
By John W. Harley.
Attorney

Dec. 22, 1925.

S. H. PERKY

ROLL

Filed May 27, 1922

Inventor
Scott H. Perky

By John W. Llorley
Attorney

Patented Dec. 22, 1925.

1,566,771

UNITED STATES PATENT OFFICE.

SCOTT H. PERKY, OF SUMMIT, NEW JERSEY.

ROLL.

Application filed May 27, 1922. Serial No. 564,116.

*To all whom it may concern:*

Be it known that I, SCOTT H. PERKY, a citizen of the United States, residing at Summit, in the county of Union and State of New Jersey, have invented certain new and useful Improvements in Rolls; and I do hereby declare the following to be a full, clear, and exact description of the invention, such as will enable others skilled in the art to which it appertains to make and use the same.

My invention relates to rolls.

Among the objects of my invention are:—

To provide a roll suitable for use in preparing material in ribbon form and providing same with cross bars or other figures.

To provide a roll capable of rolling a ribbon of plastic material and producing thereupon embossed figures, cross bars or interstices and combining with the rolls a comb to insure the effective delivery of the ribbon without fracture of any part thereof.

These and other objects of my invention will be explained in the following specification, reference being had to the accompanying drawings which are illustrative of one form of mechanism for carrying out my invention, and the means by which the results are effectuated will be definitely pointed out in the claims.

In the drawings:—

5 represents the bed plate of the machine upon which bearings such as 6 and 7 are mounted and in these bearings revolve the pintles 8 and 9 of the rolls 10 and 11, respectively.

Figure 1:
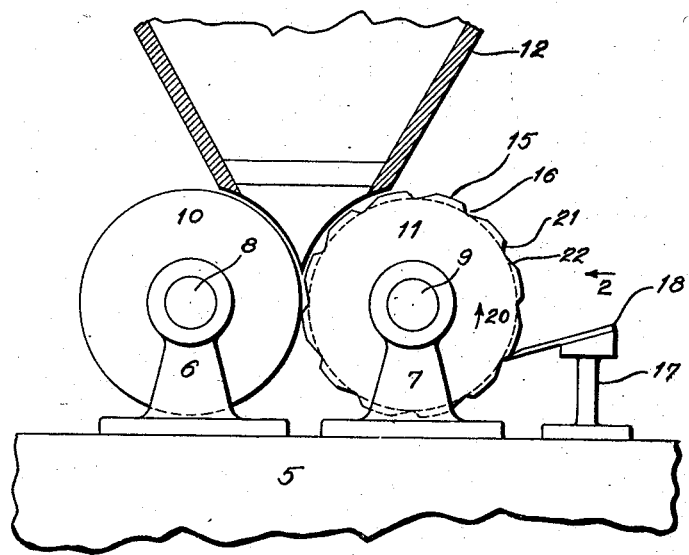
Figure 1 is a side view showing a portion of a machine equipped with one of my improved rolls.

It is to be understood that the roll 10 is cylindrical in shape and that it is provided at the end opposite to that shown in Fig. 1 with a pintle similar to 8 which revolves in bearings similar to 6 that is likewise secured to the base 5.

Similarly the roll 11 is provided at the end opposite to that shown in Fig. 1 with a pintle similar to 9 that revolves in a bearing similar to 7 that is likewise secured to the base 5.

The roll 11 is to be revolved in any approved manner by any approved source of power and the roll 10 is to be either revolved by its contact with the roll 11 or if the roll 10 is placed at a distance from the roll 11, then the roll 10 is to be driven from the roll 11 by any approved mechanism.

It is to be understood that the bearing 6 is movable with reference to the bearing 7 in order that the relative positions of the rolls 10 and 11 may be varied. The means by which the position of the bearing 6 is adjusted may be varied as desired.

A hopper 12 is supported in any approved manner in proper relation to the rolls 10 and 11 to receive material and deliver same between said rolls.

Figure 2:
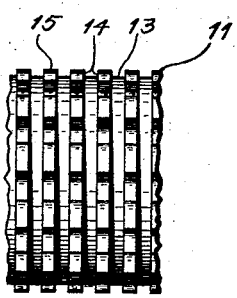
Fig. 2 is a view of one of my improved rolls looking in the direction of the arrow 2 in Fig. 1.
Figure 3:
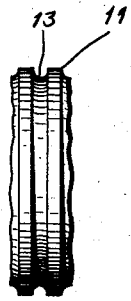
Fig. 3 shows a variation that may be made in the grooves in the rolls.

The roll 11 is provided with a plurality of grooves such as 13, the bottoms of which may be straight as shown in Fig. 2, or curved as shown in Fig. 3. The bottoms of the grooves 13 may be made in any shape desired and the width of said grooves may be varied. Said grooves may have parallel sides such as 14 or the sides may be sloping or curved in any way.

The flanges 15 between the grooves 13 are each provided with a plurality of irregularly or equi-angularly disposed recesses such as 16.

A comb support 17 is secured upon the base 5 and a plurality of comb teeth such as 18, one for each groove 13, is secured upon the support 17. The top of the support 17 is a plane forming the proper angle with the base 5 in order to hold the teeth 18 in the proper position to remove the ribbon 19 from the roll 11.

When the upper surfaces of the support 17 is a plane as just described, then the recesses 16 will be in alignment as shown in Fig. 2. It is to be understood however, that a curve or other shape may be provided in lieu of the plane at the top of the support 17 and the teeth 18 will follow the contour of said curve or other shape. In either of these cases, the recesses 16 are to be located in the various flanges 15 so that they will reach the points of the teeth 18 simultaneously when the roll 11 is revolving in the direction of the arrow 20 in Fig. 1.

The recesses 16 are shown as formed by mutually obliquely disposed surfaces 21 and 22.

The ribbon 19 formed by my improved rolls has a plurality of lengthwise disposed ribs such as 23 joined together by a plurality of transversely disposed ribs such as 24.

It is to be understood that when the roll 10 is in contact with the roll 11, interstices will exist between these ribs. When, however, these rolls are separated, then the ribbon will consist of a body having raised ribs thereupon.

The operation of my improved roll is as follows:—

Figure 4:
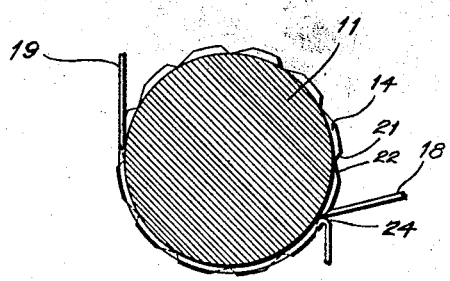
Fig. 4 is a transverse section through the centre of one of the grooves 13 in order to show the manner in which the rolled material is removed from the roll 11.
Figure 5:
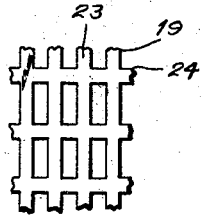
Fig. 5 is a fragmentary view of the ribbon formed by my improved rolls, viewed from the side away from the roll.

The material being introduced within the hopper 12 it passes between the rolls 10 and 11, is reduced to a plastic condition and formed into a sheet which, owing to the greater surface exposed by the roll 11, adheres thereto and is carried around upon said roll as shown in Fig. 4 until it encounters the ends of the teeth 18 which force the ribbon 19 from the roll 11.

As the ribbon 19 is forced from the roll 11 the cross ribs 24 move along an involute curve and the following surfaces 22 of the recesses 16 are so disposed that during said motion the rib 24 will not be broken by the surface 22. The surfaces 22 are, therefore, to be made either in the form of an involute curve, or a curve having a less radius of curvature, or a plane surface that will be entirely within the involute curve. By this construction, I insure that the surfaces 22 will not fracture the cross ribs 24.

While I have shown the surfaces 21 and 22 as mutually inclined planes, it is to be understood that any suitable shapes may be used instead of the surfaces 21 and 22, the requirements being that the latter surfaces be so disposed as not to fracture the cross ribs 24.

The recesses 16 may extend to the same depth as the grooves 13 or to any less distance. It is desirable that the recesses 16 do not extend beyond the bottoms of the grooves 13, for in this case, the ribbon cannot be as readily removed from the roll 11 as hereinabove explained.

In order to produce an extremely crisp and friable food product, it is desirable to have the recesses 16 more capacious than the grooves 13, for the reason that the material will enter the recesses 16 from the hopper 12 more readily than it enters the grooves 13 and the roll 10 will then subject the material in the recesses 16 to a greater pressure than the material in the grooves 13, for it will force the excess material from the recesses 16 into the grooves 13. Thus, there will be planes of cleavage between the material in the recesses and the material in the groove, and said material will readily break into granules when being masticated. Furthermore, these planes of cleavage render the crispness of my product permanent.

While I have shown one embodiment of my invention for purposes of illustration, it is to be understood that the invention is not to be limited thereto, for many changes may be made in the structure shown without departing from the spirit of my invention.

I claim:—

1. A roll comprising a plurality of flanges, said flanges having recesses formed therein, the following surfaces of said recesses being within an involute curve.

2. The combination with a roll comprising a plurality of flanges, of a comb having a plurality of teeth, one tooth extending between each pair of adjacent flanges and recesses formed in said flanges, the following surfaces of said recesses being within an involute curve.

3. The combination with a roll comprising a plurality of flanges, means for feeding material to said roll and cooperating mechanism for forming said material into the form of a ribbon adhering to said roll, said flanges comprising recesses for forming cross ribs on said ribbon, of means for removing said ribbon from said roll, the following surfaces of said recesses being within an involute curve whereby the deformation of said ribs during the removal of said ribbon from said roll is avoided.

4. The combination with a roll comprising a plurality of flanges, means for feeding material to said roll and cooperating mechanism for forming said material into the form of a ribbon adhering to said roll, said flanges comprising recesses for forming cross ribs on said ribbon, of means for removing said ribbon from said roll, said means comprising comb teeth extending between said flanges, the under surface of the points of said teeth being above the top surface of said ribs.

5. A roll comprising a plurality of flanges, grooves between said flanges, and recesses formed crosswise of said flanges, said recesses being more capacious than said grooves, whereby planes of cleavage are provided between the material formed by said recesses and the material formed by said grooves.

In testimony whereof, I affix my signature.

SCOTT H. PERKY.